United States Patent [19]

Triebold et al.

[11] 4,122,432

[45] Oct. 24, 1978

[54] DEVICE FOR IDENTIFYING NOISE SOURCES

[75] Inventors: Karl Friedrich Triebold; Sigmar Myrzik; Johann Friedrich Böhme, all of Bremen, Germany

[73] Assignee: Fried. Krupp Gesellschaft mit beschränkter Haftung Atlas Elektronik Bremen, Bremen, Germany

[21] Appl. No.: 129,584

[22] Filed: Mar. 30, 1971

[51] Int. Cl.$^2$ ............................................. G08B 13/00
[52] U.S. Cl. ........................................ 340/15; 340/22
[58] Field of Search .................... 181/0.5 AP, 0.5 NP, 181/0.5; 340/15, 16, 258, 261, 268; 179/1

[56] References Cited

U.S. PATENT DOCUMENTS

| | | | |
|---|---|---|---|
| 3,147,467 | 9/1964 | Laakman | 340/15 |
| 3,471,846 | 7/1969 | Cotler et al. | 340/15 |
| 3,553,723 | 1/1971 | Ohrsborg | 340/147 |

*Primary Examiner*—Harold Tudor
*Attorney, Agent, or Firm*—Spencer & Kaye

[57] ABSTRACT

A system for identifying an object, and in particular a vehicle, by analyzing the noise spectrum emitted thereby to determine the basic noise characteristic thereof and then comparing the basic noise spectrum signal with known basic noise spectra. The noise from the object, which includes both the basic noise characteristic and other superimposed noise, is detected and converted to an electrical analog signal which is then sampled. The sampled electrical signal, preferably after passing through an analog to digital converter, is sequentially converted into its orthogonal components in the frequency domain, e.g. by means of a Fourier conversion, converted into a signal with the logarithms of the noise spectrum components, and then reconverted into a signal of the noise spectrum components in the time domain, e.g. an inverse Fourier conversion. The resulting vector signal, which has a course which monotonously decays from an initial high value followed by a rise to a second relative maximum, is gated so that only the portion thereof prior to the rise which portion represents the basic noise characteristic of the object, is passed to a device for comparing this signal with stored signals representing the basic noise characteristic of known objects.

6 Claims, 1 Drawing Figure

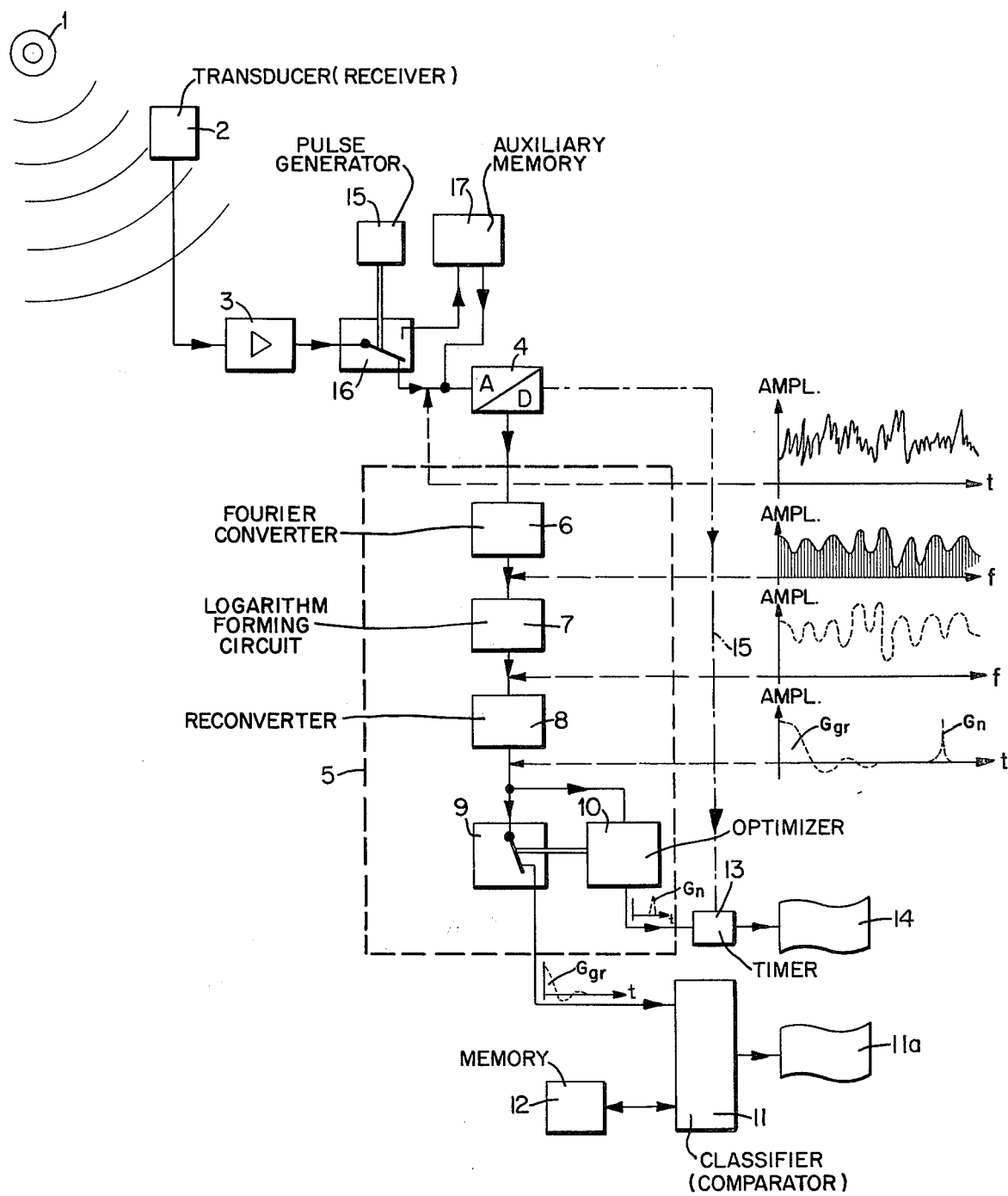

DEVICE FOR IDENTIFYING NOISE SOURCES

BACKGROUND OF THE INVENTION

The present invention relates to an improved apparatus for classifying or identifying noise sources, particularly vehicles, whose noise spectra are detected by a receiving device and are stored after conversion into a desired form of electrical signal and/or compared in any known classifier with earlier stored and converted noise signals corresponding to known noise sources.

In several technical fields there exists a need for the ability to classify or identify noises from technical structures which act as noise sources in order to be later able to identify, with the aid of stored noise samples and/or noise characteristics, the technical structure itself or its manufacturing series.

Such a need exists, for example, in the field of aviation, when an aircraft comes into the vicinity of an airfield over which there is a cloud cover so that it is impossible to visually observe the aircraft. Under such conditions, while the position of the aircraft can be determined by radar, its identity can only be determined with sufficient accuracy by a classification of its sound.

Similar interest exists in the field of navigation where it is the usual practice during fog or poor visibility due to haze to locate the position of strange ships by radar. However, radar screens generally display targets such as ships only in an approximated dot shape and consequently do not provide any information as to the size and type of the ship. This additional information can be obtained, however, with a device according to the present invention.

It is known that it is possible for a human being, after some practice or experience, and with the help of his memory of previously heard sounds, to recognize characteristic sounds, sound pictures or noises, to classify them and perhaps specifically identify their source. However, this method must remain imperfect due to the human fallibility so that errors cannot be excluded. The requirements for automatization therefore require instruments which can provide the corresponding information without human assistance and in a manner that can be accurately reproduced.

Methods for classifying or identifying human voice sounds are known from the published literature. For example, U.S. Pat. No. 2,891,111 describes a system for the automatic analysis of the human voice.

The literature also discloses a method for classifying vehicles, and in particular water vehicles, which method, however, requires very complicated and time-consuming preparatory work.

According to this method, the noise spectrum during every stage of movement, including the rest state, which can occur during operation for any vehicle or vehicle type which it is desired to later classify must first be recorded and stored so that the recorded noise spectra can later be compared with the noise of a vehicle to be identified. In this connection, see the paper entitled "State of the Art in Pattern Recognition", by G. Nagy, published in "Proceedings of the IEEE", Volume 56, No. 5, May, 1968, pages 832–862.

This method thus requires a large number of processing means and a large storage capacity which is not always available, and which is undesirable for economic reasons.

SUMMARY OF THE INVENTION

It is therefore the object of the present invention to provide a system or apparatus of the above-mentioned general type with which it is possible, with an economically supportable quantity of circuitry, to unequivocally derive at least the characteristic basic noise for a particular noise source from a received and converted noise spectrum and, if possible, also the operational characteristics of the noise source, for example, the momentary stage of movement.

The above and other objects are accomplished according to the present invention in that a noise signal is detected and converted into an electrical signal which is then converted into a classifiable vector signal by a signal processor which includes circuitry for orthogonal conversion, e.g. by Fourier conversion, of a continuously received noise spectrum in a time interval, which is determined by a clock pulse generator, in order to form the logarithms of the noise spectrum within the frequency domain and then to reconvert the logarithms of the noise spectrum into a signal (classification vector) in the time domain. The processor also includes a final or output gating circuit which is controlled by the classification vector signal so that only the portion of the classifying vector signal corresponding to the characteristic basic noise is fed to the device for comparing same with previously recorded classifying vector signals.

The following considerations led to the solution of the present invention.

In the analysis of vehicle noises, it was found that each vehicle develops a basic noise which is characteristic of its structural type but which is hidden in the noise spectrum among other superimposed noises.

Vehicles are always vibratory structures in which the mechanical dimensions of their construction determine one or a plurality of resonance levels of their characteristic basic noise. This basic noise remains typical for an entire series or group of vehicles as long as no substantial structural modifications are made.

The basic noise is mostly produced by the drive and auxiliary engines of the vehicle and by its other drive means, such as wheels, propellers, jet assemblies, etc. The exciting function is pulse-shaped in most cases and thus has a wide spectral band.

In such vehicles, the entire assembly acts as vibrator, with the vehicle itself acting as the resonator. Measurements have shown that the noise spectrum produced during operation of the vehicle, this including the rest state and the different stages of movement, usually changes considerably in practice with the changing operational state.

In contradistinction thereto, the basic noise which is characteristic for the particular type of vehicle under observation remains unchanged in the noise spectrum although it is imperceptible to the human ear and conventional devices or systems for the classification or identification of vehicles.

The apparatus of the present invention must therefore be able to dependably detect the basic noise in the entire noise spectrum without regard to the changing composition of the noise spectrum.

After detecting the noise spectrum by means of a sound transducer which converts the noise spectrum to an electrical signal, the noise spectrum is first amplified in the same manner as in the conventional passive sonar system.

Thereafter, a selected time interval of the amplitude path of the noise over a limited frequency band is converted, by equidistant scanning, to a vector to be classified. The obtainable resolution, which can also be called the analyzing bandwidth, is inversely proportional to the length of the selected time interval, i.e. the duration of the observation.

This vector to be classified is fed to the signal analyzer or converter as its input signal and is there sequentially subjected, by means of suitable components which will be described below, to an orthogonal conversion in the frequency domain, the forming of the logarithms of the orthogonal components and finally the reconversion of the logarithms into a noise spectrum signal in the time domain. The result of this processing is a classification vector, i.e. a signal whose time sequence is very similar to the autocorrelation function of the energy spectrum of the observed noise spectrum, as can be shown by mathematical analysis. The result is also called a pseudo autocorrelation function. This pseudo autocorrelation function has a very high initial value with short displacement times from which after a period of time it monotonously drops or decays, more or less steeply. This curve contains the information about the basic noise which is to be fed to the classifier, or device for comparing the classifying vector with previously recorded vectors.

The correlative signal processing has the effect, however, that the curve of the classification vector will increase again after a certain time and pass through a further relative maximum.

The position of this further maximum with reference to the starting point of the time interval of this classification vector corresponds, in the correlation technique, to a shift and thus represents a measure for the causes of the ancillary noises, and in particular, the momentary stage of movement of the observed vehicle.

This re-ascending portion in the path of the classification vector must, however, be kept away from the classifier device since it would falsify the information about the basic noise. Therefore, according to the present invention, a suitable gating or filter circuit is provided at the output of the signal processing unit. An optimizer or other circuit which evaluates the path or course of the classification vector or a suitably programmed process computer may be utilized to control this gating or filter circuit.

The thus obtained basic noise signal from each vehicle or vehicle type can be stored in an associated memory when it is entered into the classifier or comparator for the first time. Thereafter, when the noise from an unknown vehicle is detected, it is only necessary to compare the basic noise signal in a classifier with the basic noises stored in the memory in order to be able to accurately identify the vehicle or its type.

The device according to the present invention for classifying or identifying vehicles by means of their noise spectrum thus offers the advantage that a certain vehicle or a vehicle from a certain series can be classified with any composition of its noise spectrum without the need for considering its momentary state of movement or rest and with the smallest possible storage capacity requirements.

BRIEF DESCRIPTION OF THE DRAWING

The sole drawing FIGURE is a block circuit diagram of a noise source identifying system according to the present invention.

Within the diagram some sketches are provided which show examples of the signals appearing at various inputs of the block circuits.

DESCRIPTION OF THE PREFERRED EMBODIMENT

Referring now to the drawing FIGURE, there is shown a noise source 1 which is preferably a vehicle, which emits sound waves through the surrounding medium. These sound waves are detected by a broadbanded receiving transducer 2 which converts them to an electrical signal which is amplified in an amplifier 3. The output signal of amplifier 3 is sampled by means of a sampling switch 16 under control of a clock pulse generator 15 to provide samples of the signal during predetermined time intervals. The signal passed by the gate 16 during the sampling interval is converted by means of a known analog-digital converter 4, to a succession of discrete amplitude values constituting the vector signal V to be classified.

Signals appearing at the output of amplifier 3 outside of the preselected sampling time interval may be fed, for example to a special auxiliary memory or recorder 17 via a further contact of the sampling switch 16 where they may be stored in order that they be available, if required, for a later repetition of the signal evaluation when the respective noise source is no longer at hand.

The signal, i.e., the vector signal V, appearing at the output of sampling switch 16, is fed, preferably as indicated after conversion to a digital form by means of converter 4, to the input of a signal analyzer 5 which converts the vector signal V into a form whereby it may be automatically compared with previously identified or classified signals for the purpose of identifying the noise source 1. In the analyzer 5, the vector signal V is initially subjected to an orthogonal conversion in the frequency domain. For this purpose, in the illustrated embodiment, Fourier converter 6 is utilized. A device suitable for this purpose is disclosed, for example, in the following publications, Peter K. Bice, *Speed up the fast Fourier transform*, ELECTRONIC DESIGN, Vol. 9, April 26th, 1970, pp. 66–69, and Richard Klahn et al, *The time-saver: FFT hardware*, ELECTRONICS, June 24th, 1968, pp. 92–97. It is to be understood, however, that other types of converters may equally well be used. For example, the Walsh functions disclosed in German Published Patent Application No. DOS 1,804,573 published January 22nd, 1970, which corresponds to U.S. Pat. No. 3,553,723, issued Jan. 5th, 1971, to F. Ohnsorg, are also suitable for the orthogonal conversion in the input stage of analyzer 5.

In any case, the Fourier conversion which is utilized permits a subdivision of the frequency mixture into orthogonal frequency components as can be easily proven mathematically.

The resulting frequency components are, however, a product of the basic noise $G_{gr}$ characteristic for the vehicle 1 to be classified and identified and an ancillary noise $G_n$ which is preferably typical of a variable operational state of the same vehicle 1. In order therefore to be able to separate the basic noise characteristic in the frequency components from the remainder of the noise, this product $G_{gr} \cdot G_n$ is fed into a logarithm forming circuit 7 so that in a known manner, in the output signal thereof, the frequency components appear as separatable sum expressions. Such a logarithm forming circuit is described, for example, by the BURR BROWN Research Corporation in its "1969 Catalog for Operational Amplifiers" on page 18.

The final separation between the basic noise $G_{gr}$ and the ancillary noise $G_n$ frequency components of the frequency mixture is advisably made only after a reconversion into a time-dependent signal has taken place in a reconverter 8, e.g. by means of an inverse Fourier conversion. The output signal of the reconverter 8 is the classification vector signal $V_k$.

Under the assumption that the spectral distribution of the higher-frequency (as indicated by the measurements) basic noise $G_{gr}$ does not substantially overlap, the curve of the classification vector $V_k$ represents the sum of two pseudo autocorrelation functions.

This curve contains the initial monotonously dying out or decaying component of the basic noise $G_{gr}$ followed by a new relative maximum which appears after a certain period of time.

The time position of this new relative maximum within the selected time interval is a measure for additional influences or conditions of the noise source. For example, it permits the recognition of the momentary stage of movement of the vehicle 1.

Since, as indicated above, it is undesirable for the ascending portion of vector signal $V_k$ leading to this further maximum to be transmitted for evaluation with previously recorded signals, this further maximum is detected by an optimizer 10 which controls a gating circuit 9 or another suitable multiplying filter connected to the output of the reconverter 8 in such a manner that only the monotonously decaying component of the classification vector signal $V_k$, which corresponds to the basic noise characteristic $G_{gr}$, is switched through to the classifier or comparator 11, which may for example be a computer. Based on the criteria contained in this component $G_{gr}$, the classifier 11, in a known manner, compares the basic noise spectrum $G_{gr}$ of the vehicle 1 of interest with the basic noise spectrum signals which are already contained in a memory 12. The result of this comparison is made accessible by a readout device 11a as it is known from the computer art.

If the classifier 11 should not be able to accurately match the incoming basic noise signal $G_{gr}$ with a previously recorded or stored signal, then by means of an internal selection circuit the new basic noise $G_{gr}$ is stored with the addition of a code term, if required, as an indication of a previously unclassifiable vehicle 1.

Within the scope of readout device 11a or by means of a special output device 14 it is possible to indicate the shift between the beginning of the selected time interval and the position of the maximum in the course of the classification vector $V_k$ in order to provide information as to the noise other than the basic noise characteristic and thus the momentary stage of movement of vehicle 1. To this end, a time measuring instrument 13, e.g. a timing circuit, is provided which is turned on by a control signal, indicated schematically by the line 15, at the beginning of the selected sampling interval and turned off by a signal from the optimizer 10 at the appearance of the further maximum in the classifying vector signal $V_k$.

Rather than sampling the received signal as illustrated, it may be advisable, within the scope of the present invention, to continuously store the received noise spectrum in a separate auxiliary store such as memory 17 and to successively select or sample a plurality of time intervals from this stored spectrum to be analyzed in the above-described manner.

In order to more clearly illustrate the invention, sketches showing examples of the signal appearing at various inputs of the block circuits are provided in the FIGURE. From the time-diagram of the received signal, at the entry of the A/D converter 4, no characteristic information is readily apparent.

The frequency-spectrum obtained by fourier conversion in the converter 6 shows an regular quick oscillation, when the received signal is the noise of ships. In practice this conversion is performed digitally with some thousand amplitude being taken within each oscillation.

The logarithm forming circuit 7 delivers a non-linear influence to the frequency spectrum signal fed thereto.

This logarithm influenced frequency-spectrum signal is then reconverted into a time-diagram in the converter 8. The plurality of descrete amplitude values along the time axis of the reconverted signal, i.e. $G_{gr}(t)$ and $G_N(t)$, which in most of practical interesting cases are both clearly (none-overlapping) separated from one another, is the above so called classification vector $V_K$. The timer 13 then measures the time until the peak of $G_N$ occures, while in the classifier 11 the actual time-diagram of $G_{gr}$ is compared with other time diagrams, belonging to known objects and stored in the memory 12. It will be understood that the above description of the present invention is susceptible to various modifications, changes and adaptations and the same are intended to be comprehended within the meaning and range of equivalents of the appended claims.

We claim:

1. In an apparatus for identifying acoustical noise sources, and in particular vehicular noise sources, including means for detecting the noise signal and converting same to an electrical signal of the noise spectrum, means for converting said electrical signal to a classifying electrical vector signal $V_k$, and means for storing and/or comparing said vector signal $V_k$ with previously stored vector signals $V_k$ to identify same, the improvement wherein said means for converting said electrical signal to a classifying electrical vector signal $V_k$ comprises:
   means for sampling said electrical signal of the noise spectrum at equidistant sampling intervals;
   first circuit means for converting the signal sampled during a time interval into its orthogonal components in the frequency domain;
   second circuit means responsive to the output signal of said first circuit means for forming the signal containing the logarithms of the vector components of the noise spectrum;
   means for reconverting said logarithms containing signal into a signal of the noise spectrum in the time domain to form said classifying vector signal $V_k$;
   a gating means passing the output signal from said reconverting means to said means for comparing said vector signal $V_k$ with previously stored vector signals $V_k$; and
   means responsive to the classifying vector signal $V_k$ appearing at the output of said reconverting means for controlling the condition of said gating means.

2. The apparatus defined in claim 1 including an analog to digital converter connected between the output of said sampling means and the input of said first circuit means.

3. The apparatus defined in claim 1 wherein said classification vector signal $V_k$ has a shape which monotonously decays from an initial high value after which it ascends to a further relative maximum, and wherein said means for controlling the condition of said gating means includes a signal analyzer for providing an output signal which opens said gating means to prevent the passage of a signal therethrough when said classification vector ascends after its initial monotonous decay whereby only the portion of the classification vector signal $V_k$ which constitutes the basic noise characteristic of the noise source independent of its stage of movement is fed to said means for comparing the vector signal $V_k$ with previously stored vector signals $V_k$.

4. The apparatus defined in claim 3 including means for measuring the time between the beginning and said further relative maximum of said classifying vector signal $V_k$ as an indication of the momentary stage of movement of said noise source.

5. The apparatus defined in claim 4 wherein said signal analyzer provides a further output signal when said classifying vector $V_k$ reaches said further relative maximum; and wherein said time measuring means includes a timing circuit, means for turning on said timing circuit at the beginning of the sampling interval, said timing circuit being responsive to said further output signal from said signal analyzer for ceasing its count, and means for storing the output count of said time circuit.

6. The apparatus defined in claim 3 wherein said first circuit means is a Fourier converter and wherein said means for reconverting said logarithm containing signal is an inverse Fourier converter.

* * * * *